(12) United States Patent
Haraguchi et al.

(10) Patent No.: US 11,683,115 B2
(45) Date of Patent: Jun. 20, 2023

(54) OPTICAL CONTROL TYPE PHASED ARRAY ANTENNA

(71) Applicant: Mitsubishi Electric Corporation, Tokyo (JP)

(72) Inventors: Eisuke Haraguchi, Tokyo (JP); Toshiyuki Ando, Tokyo (JP)

(73) Assignee: MITSUBISHI ELECTRIC CORPORATION, Tokyo (JP)

( * ) Notice: Subject to any disclaimer, the term of this patent is extended or adjusted under 35 U.S.C. 154(b) by 0 days.

(21) Appl. No.: 17/545,004

(22) Filed: Dec. 8, 2021

(65) Prior Publication Data

US 2022/0094459 A1 Mar. 24, 2022

Related U.S. Application Data

(63) Continuation of application No. PCT/JP2019/027663, filed on Jul. 12, 2019.

(51) Int. Cl.
*H04J 14/02* (2006.01)
*H01Q 3/26* (2006.01)
*H04B 10/50* (2013.01)

(52) U.S. Cl.
CPC ........... *H04J 14/02* (2013.01); *H01Q 3/26* (2013.01); *H04B 10/506* (2013.01)

(58) Field of Classification Search
CPC ........ H04J 14/02; H04J 14/00; H04B 10/588; H04B 10/506; H04B 10/54; H01Q 3/26; H01Q 21/00; H01Q 21/24; H01Q 25/00
USPC .................................. 398/81, 79, 82, 43, 48
See application file for complete search history.

(56) References Cited

U.S. PATENT DOCUMENTS

| | | | |
|---|---|---|---|
| 6,426,721 B1 * | 7/2002 | Obara | H01Q 3/2676 342/372 |
| 2017/0310006 A1 * | 10/2017 | Vidal Drummond | H01Q 3/2676 |
| 2020/0150346 A1 * | 5/2020 | Cavaliere | G02B 6/12007 |

FOREIGN PATENT DOCUMENTS

| JP | 9-246840 A | 9/1997 |
|---|---|---|
| JP | H09246840 A * | 9/1997 |

OTHER PUBLICATIONS

International Search Report, issued in PCT/JP2019/027663, dated Sep. 3, 2019.

(Continued)

*Primary Examiner* — Hibret A Woldekidan
(74) *Attorney, Agent, or Firm* — Birch, Stewart, Kolasch & Birch, LLP

(57) ABSTRACT

An optical control type phased array antenna includes: a plurality of antenna elements; a multi-wavelength light source; an optical demultiplexing circuit for separating a plurality of optical signals and local oscillation light from output light of the multi-wavelength light source; optical modulators for generating a plurality of modulated optical signals by modulating the plurality of optical signals with the output signals of the plurality of antenna elements; an optical coupler for multiplexing the plurality of modulated optical signals and the local oscillation light to generate multiplexed light and dividing the multiplexed light into reception optical signals of a plurality of channels; and an optical dispersion compensation circuit for compensating for a phase difference between the plurality of modulated optical signals by performing dispersion compensation on the reception optical signals, respectively.

20 Claims, 10 Drawing Sheets

(56) References Cited

OTHER PUBLICATIONS

Ji et al., "Receive Mode of Optical Signal Processing Multibeam Array Antennas", IEEE Microwave and Guided Wave Letters, Jul. 1998, vol. 8, No. 7, pp. 251-253.
Written Opinion of the International Searching Authority, issued in PCT/JP2019/027663, dated Sep. 3, 2019.

* cited by examiner

OPTICAL CONTROL TYPE PHASED ARRAY ANTENNA

CROSS REFERENCE TO RELATED APPLICATIONS

This application is a Continuation of PCT International Application No. PCT/JP2019/027663, filed on Jul. 12, 2019, which is hereby expressly incorporated by reference into the present application.

TECHNICAL FIELD

The present invention relates to an optical control type phased array antenna for performing optical signal processing in an optical frequency domain.

BACKGROUND ART

In recent years, research and development of an optical control type phased array antenna has been conducted, the antenna including an antenna array including a plurality of antenna elements for receiving a reception wave in a high frequency band such as a microwave band, a conversion circuit for converting output signals of the plurality of antenna elements into optical signals for a plurality of reception channels, and an optical signal processing circuit for performing optical signal processing such as phase modulation and amplitude modulation on the optical signals in parallel. Such an optical control type phased array antenna is disclosed in, for example, Patent Literature 1 (Japanese Patent Application Laid-Open No. 09-246840).

CITATION LIST

Patent Literature

Patent Literature 1: Japanese Patent Application Laid-Open No. 09-246840 (see, for example, FIG. 1)

SUMMARY OF INVENTION

Technical Problem

In a conventional optical control type phased array antenna, there is a problem that a phase difference occurs between output signals of a plurality of antenna elements in accordance with an arrival direction of a reception wave to an antenna array, and that this causes a decrease in reception efficiency. In order to cope with this problem, it is possible to provide a spatial optical compensation circuit for spatially compensating for the phase difference between the output signals in the optical frequency domain. However, alignment of such an optical compensation circuit requires highly accurate adjustment. In a case where misalignment occurs due to an influence of an environmental change such as a temperature change, there is a problem that reception efficiency is deteriorated.

In view of the above, an object of the present invention is to provide an optical control type phased array antenna capable of suppressing deterioration in reception efficiency caused by an arrival direction of a reception wave and having excellent environmental resistance.

Solution to Problem

An optical control type phased array antenna according to an aspect of the present invention includes: an antenna array including a plurality of antenna elements for receiving a reception wave in a high frequency band lower than an optical frequency band; a multi-wavelength light source for outputting light including a plurality of spectral components having each of a plurality of optical frequencies different from each other; an optical demultiplexing circuit for separating a plurality of optical signals each having the plurality of spectral components and local oscillation light from output light of the multi-wavelength light source; a plurality of optical modulators for generating a plurality of modulated optical signals by modulating the plurality of optical signals with output signals of the plurality of antenna elements, respectively; an optical coupler for multiplexing the plurality of modulated optical signals and the local oscillation light to generate multiplexed light and dividing the multiplexed light into reception optical signals of a plurality of channels; and a plurality of optical dispersion compensators for compensating for a phase difference between the plurality of modulated optical signals by performing dispersion compensation on the reception optical signals, respectively.

Advantageous Effects of Invention

According to an aspect of the present invention, it is possible to implement a configuration that compensates for a phase difference between modulated optical signals without using a spatial system, so that it is possible to provide an optical control type phased array antenna capable of suppressing deterioration in reception efficiency caused by an arrival direction of a reception wave and having excellent environmental resistance.

DESCRIPTION OF EMBODIMENTS

Figure 1:
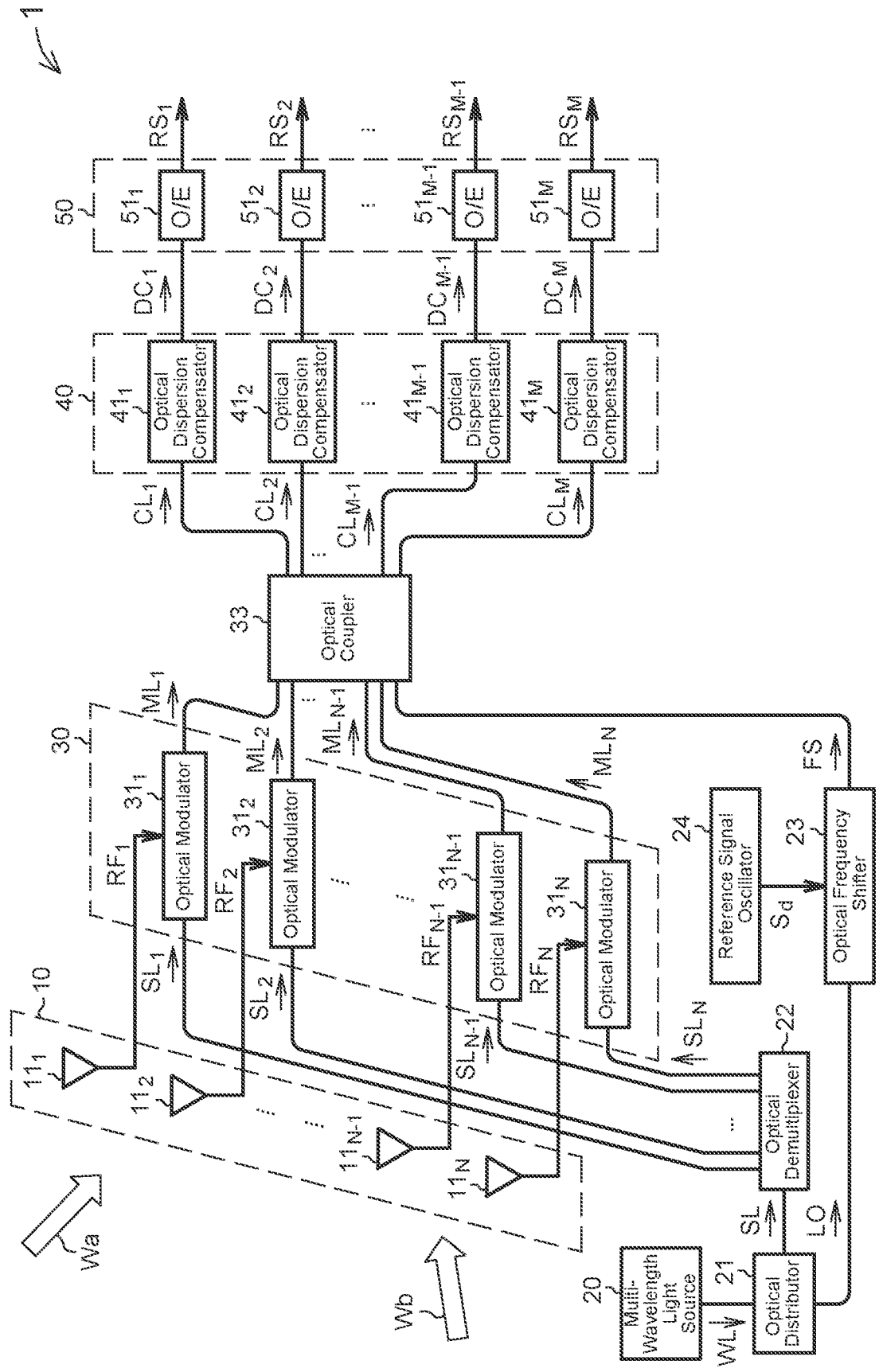
FIG. 1 is a diagram illustrating a schematic configuration of an optical control type phased array antenna of a first embodiment according to the present invention.

Hereinafter, various embodiments according to the present invention will be described in detail with reference to the drawings. Note that components given the same reference numerals throughout the drawings have the same configuration and the same function.

First Embodiment

FIG. 1 is a diagram illustrating a schematic configuration of an optical control type phased array antenna 1 according to the first embodiment of the present invention. As illustrated in FIG. 1, the optical control type phased array antenna 1 includes an antenna array 10 for receiving reception waves Wa and Wb in a high frequency band (for example, a microwave band) lower than an optical frequency band. The antenna array 10 includes antenna elements $11_1$, $11_2$, ..., $11_{N-1}$, and $11_N$ for outputting high-frequency signals $RF_1$, $RF_2$, ... $RF_{N-1}$, and $RF_N$, respectively, in accordance with the reception waves Wa and Wb. The number N of the antenna elements $11_1$ to $11_N$ is equal to or more than four, but is not limited thereto. The antenna elements $11_1$ to $11_N$ are spatially (for example, in a linear shape, a planar shape, or a curved shape) densely arranged. For example, the antenna array 10 may be configured by linearly arranging the antenna elements $11_1$ to $11_N$, or the antenna array 10 may be configured by laminating a plurality of linear arrays including a plurality of linearly arranged antenna elements. Since the antenna array 10 has antenna directivity depending on the arrival directions of the reception waves Wa and Wb, a phase difference may occur between the high-frequency signals $RF_1$ to $RF_N$ in accordance with the arrival directions of the reception waves Wa and Wb. As described later, the optical control type phased array antenna 1 can compensate for the phase difference.

The optical control type phased array antenna 1 includes a multi-wavelength light source 20, an optical distributor 21, an optical demultiplexer 22, an optical frequency shifter 23, and a reference signal oscillator 24. The multi-wavelength light source 20 has a function of outputting the light WL including N spectral components (narrow band components with narrow spectral line widths) $C_1$, $C_2$, ..., $C_{N-1}$, and $C_N$ having different optical frequencies $fc^{(1)}$, $fc^{(2)}$, ..., $fc^{(N-1)}$, and $fc^{(N)}$, respectively. For example, as the multi-wavelength light source 20, an optical comb (optical frequency comb) light source that generates a plurality of optical frequency modes arranged at equal intervals in an optical frequency band can be used.

The optical distributor 21 divides the output light WL of the multi-wavelength light source 20 into local oscillation light LO and signal light SL. The optical demultiplexer 22 has a function of separating optical signals $SL_1$, $SL_2$, $SL_{N-1}$, and $SL_N$ having N spectral components $C_1$, $C_2$, ..., $C_{N-1}$, and $C_N$, respectively, from the output light WL. For example, a wavelength demultiplexer may be used as the optical demultiplexer 22. The optical distributor 21 and the optical demultiplexer 22 form an optical demultiplexing circuit of the present embodiment.

The optical frequency shifter 23 has a function of shifting the optical frequency of the local oscillation light LO by an arbitrary shift amount and outputting frequency-shifted light FS. Specifically, the optical frequency shifter 23 is supplied with a reference signal $S_d$ in the high frequency band from the reference signal oscillator 24. The optical frequency shifter 23 can shift the optical frequency of the local oscillation light LO by the frequency $f_d$ of the reference signal $S_d$ to generate the frequency-shifted light FS. The frequency-shifted light FS includes N spectral components (narrow band components having a narrow spectral line width) $F_1$, $F_2$, ..., $F_{N-1}$, and $F_N$ having optical frequencies $fc^{(1)}+f_d$, $fc^{(2)}+f_d$, ..., $fc^{(N-1)}+f_d$, and $fc^{(N)}+f_d$, respectively. For example, an acousto-optic (AO) modulator or an IQ modulator can be used as the optical frequency shifter 23, but the optical frequency shifter is not limited thereto.

The multi-wavelength light source 20 and the optical distributor 21 are coupled by a non-spatial optical transmission line such as an optical fiber that propagates the output light WL, the optical distributor 21 and the optical demultiplexer 22 are coupled by a non-spatial optical transmission line such as an optical fiber that propagates the signal light SL, and the optical distributor 21 and the optical frequency shifter 23 are coupled by a non-spatial optical transmission line such as an optical fiber that propagates the local oscillation light LO.

Furthermore, the optical control type phased array antenna 1 includes an optical modulator array 30, an optical coupler 33, an optical dispersion compensation circuit 40, and a photoelectric conversion circuit 50. The optical modulator array 30 has a function of generating modulated optical signals $ML_1$ to $ML_N$ by spatially modulating the phases of the optical signals $SL_1$ to $SL_N$ supplied from the optical demultiplexer 22 using the high-frequency signals $RF_1$ to $RF_N$ supplied from the antenna array 10.

Specifically, the optical modulator array 30 includes optical modulators $31_1$, $31_2$, ..., $31_{N-1}$, and $31_N$ respectively driven by the high-frequency signals $RF_1$, $RF_2$, ..., $RF_{N-1}$, and $RF_N$ supplied from the antenna array 10. The optical modulators $31_1$, $31_2$, ..., $31_{N-1}$, and $31_N$ receive the optical signals $SL_1$, $SL_2$, ..., $SL_{N-1}$, and $SL_N$ supplied from the optical demultiplexer 22, respectively. The optical modulators $31_1$, $31_2$, ..., $31_{N-1}$, and $31_N$ modulate the optical signals $SL_1$, $SL_2$, ..., $SL_{N-1}$, and $SL_N$ with the high-frequency signals $RF_1$, $RF_2$, ..., $RF_{N-1}$, and $RF_N$, respectively, to generate the modulated optical signals $ML_1$, $ML_2$, ..., $ML_{N-1}$, and $ML_N$. The modulated optical signals $ML_1$ to $ML_N$ are supplied to the optical coupler 33. The optical modulator $31_1$ to $31_N$ and the optical coupler 33 are coupled by a non-spatial optical transmission line such as an optical fiber that propagates the modulated optical signal $ML_1$ to $ML_N$.

Figure 2A:
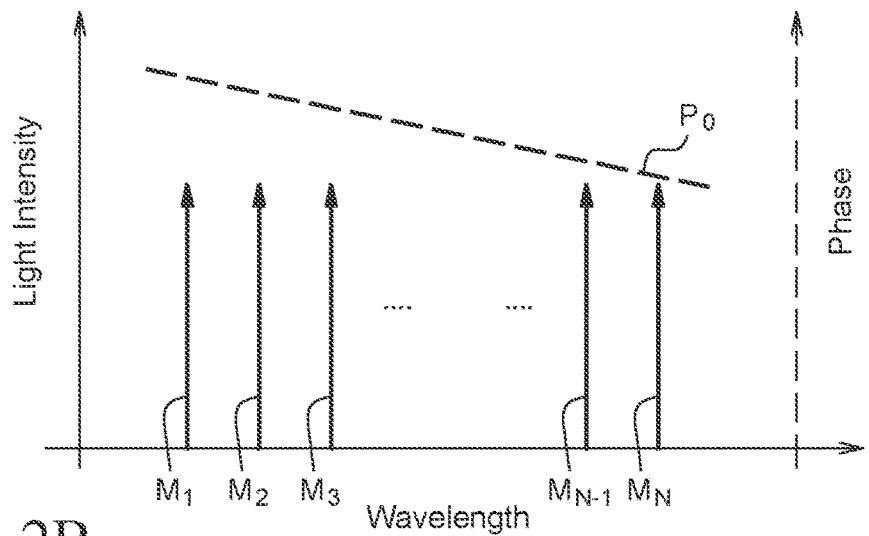
FIGS. 2A to 2C are graphs illustrating a relationship between a signal wavelength and light intensity and a relationship between a signal wavelength and a phase.

As described above, since the antenna array 10 has the antenna directivity depending on the arrival direction of the reception wave, a phase difference may occur between the high-frequency signals $RF_1$ to $RF_N$ in accordance with the arrival direction of the reception wave. Therefore, a phase difference in accordance with the arrival direction of the reception wave may also occur between the modulated optical signals $ML_1$ to $ML_N$. FIG. 2A is a graph conceptually illustrating spectral components $M_1$, $M_2$, $M_3$, ..., $M_{N-1}$, and $M_N$ of the modulated optical signals $ML_1$, $ML_2$, $ML_3$, ..., $ML_{N-1}$, and $ML_N$ and a phase distribution $P_0$ of the modulated optical signals $ML_1$ to $ML_N$. In the graph of FIG. 2A, the horizontal axis represents the wavelengths of the modulated optical signals $ML_1$ to $ML_N$, the left vertical axis represents the light intensity, and the right vertical axis represents the phase.

Here, the spectral component $M_n$ of the n-th modulated optical signal $ML_n$ includes two types of modulated light components $U_n$ and $L_n$. Now, when the frequency of the high-frequency signals $RF_1$ to $RF_N$ is represented as $f_{RF}$, the first modulated light component $U_n$ is a sideband component having an optical frequency $f_c^{(n)}+f_{RF}$ higher than the optical frequency $f_c^{(n)}$ by the frequency $f_{RF}$, and the second modulated light component $L_n$ is a sideband component having an optical frequency $f_c^{(n)}-f_{RF}$ lower than the optical frequency $f_c^{(n)}$ by the frequency $f_{RF}$.

Next, referring to FIG. 1, the optical coupler 33 collectively multiplexes the modulated optical signals $ML_1$ to $ML_N$ and the frequency-shifted light FS to generate multiplexed light, and divides the multiplexed light into the reception optical signals $CL_1, CL_2, \ldots, CL_{M-1}$, and $CL_M$ of the M reception channels. The reception optical signals $CL_1, CL_2, \ldots, CL_{M-1}$, and $CL_M$ are supplied to the optical dispersion compensation circuit 40. The optical coupler 33 and the optical dispersion compensation circuit 40 are coupled by a non-spatial optical transmission line such as an optical fiber that propagates the reception optical signals $CL_1$ to $CL_M$.

The optical dispersion compensation circuit 40 has a function of compensating for a phase difference between the modulated optical signals $ML_1$ to $ML_N$ by performing dispersion compensation on the reception optical signals $CL_1$ to $CL_M$. Specifically, the optical dispersion compensation circuit 40 includes optical dispersion compensators $41_1$, $41_2, \ldots, 41_{M-1}$, and $41_M$ that perform dispersion compensation on the reception optical signals $CL_1, CL_2, \ldots, CL_{M-1}$, and $CL_M$, respectively. For example, a chirped fiber Bragg grating (chirped FBG) or a highly nonlinear optical fiber may be used as the optical dispersion compensator $41_1$ to $41_M$.

Figure 2B:
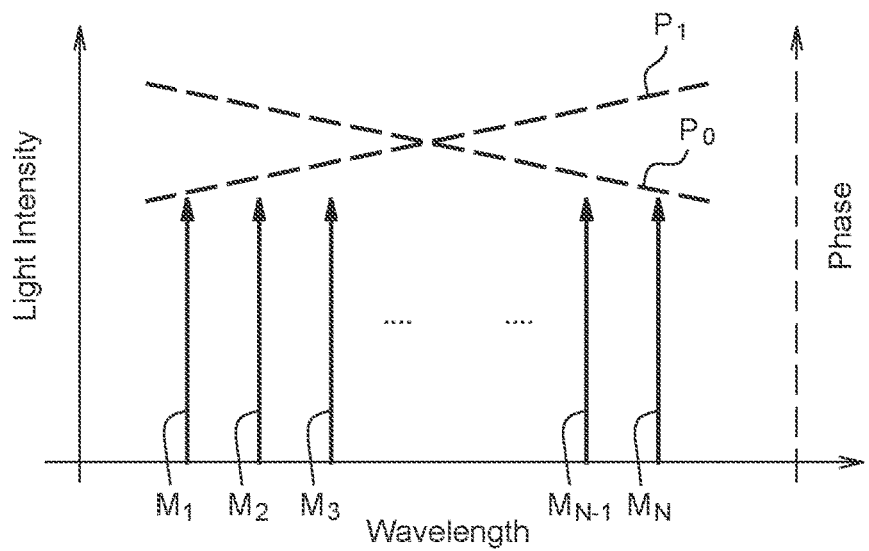
Figure 2C:
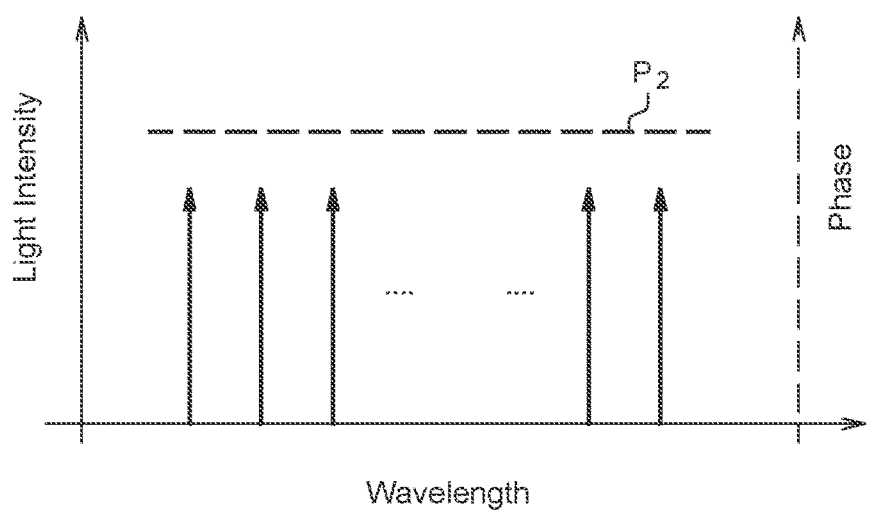

When the phase distribution $P_0$ that causes the phase difference between the modulated optical signals $ML_1$ to $ML_N$ occurs as illustrated in the example of FIG. 2A, the m-th optical dispersion compensator $41_m$ can add the phase distribution $P_1$ that cancels the phase difference to the reception optical signal $CL_m$ as illustrated in FIG. 2B. As a result, the m-th optical dispersion compensator $41_m$ can output the optical signal $DC_m$ forming the flat phase distribution $P_2$ as illustrated in FIG. 2C. In the graph of FIG. 2C, the horizontal axis indicates the wavelength of the optical signal $DC_m$, the left vertical axis indicates the light intensity, and the right vertical axis indicates the phase.

The photoelectric conversion circuit 50 includes M photoelectric converters (O/E) $51_1, 51_2, \ldots, 51_{M-1}$, and $51_M$ corresponding to M reception channels. The photoelectric converters $51_1$ to $51_M$ can convert the optical output signals $DC_1$ to $DC_M$ from the optical dispersion compensators $41_1$ to $41_M$ into electrical signals $RS_1$ to $RS_M$, respectively, and output the electrical signals $RS_1$ to $RS_M$ in parallel as reception signals (multiple beams). The frequencies of the reception signals $RS_1$ to $RS_M$ are $f_{RF}-f_d$.

Figure 3:
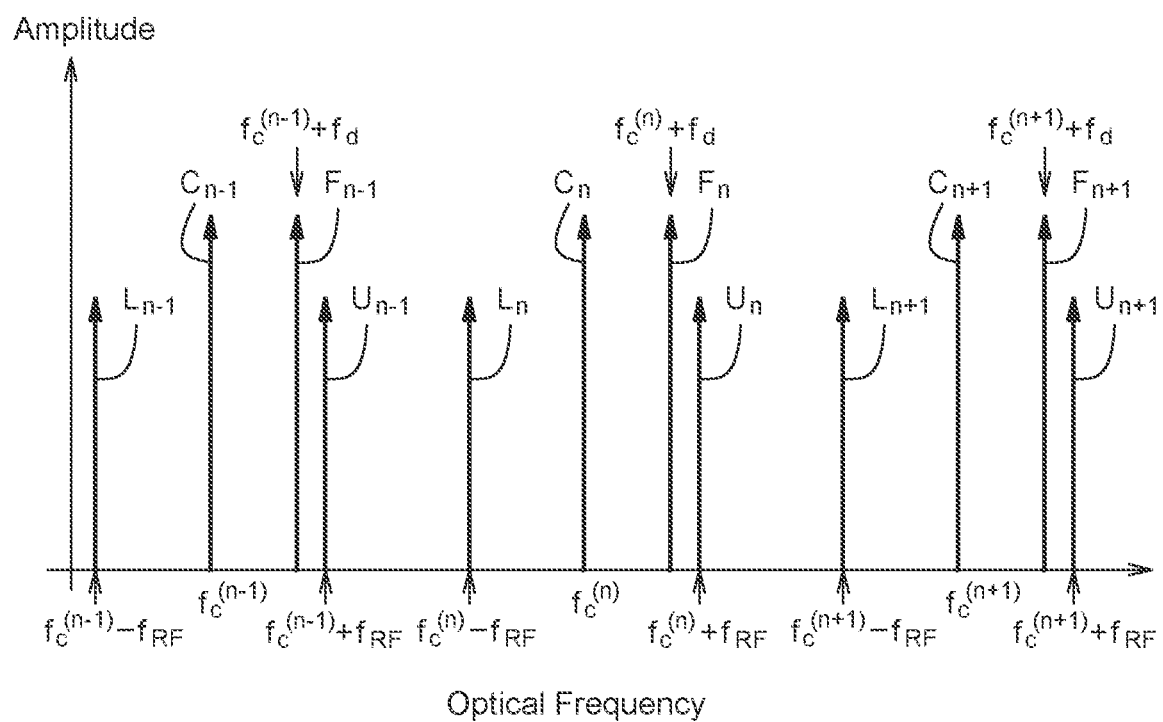
FIG. 3 is a graph illustrating a relationship between an optical frequency and a signal amplitude.

FIG. 3 is a graph conceptually illustrating the spectral components $C_{n-1}$, $C_n$, and $C_{n+1}$ of the optical signals $SL_{n-1}$, $SL_n$, and $SL_{n-1}$, the spectral components $F_{n-1}$, $F_n$, and $F_{n+1}$ of the frequency-shifted light FS, and the modulated light components $U_{n-1}$, $L_{n-1}$, $U_n$, $L_n$, $U_{n+1}$, and $L_{n+1}$ of the modulated optical signals $ML_{n-1}$, $ML_n$, and $ML_{n+1}$. In the graph of FIG. 3, the horizontal axis represents the optical frequency, and the vertical axis represents the signal amplitude.

The optical frequency interval of the multi-wavelength light source 20 is represented as $f_c(=f_c^{(n+1)}-f_c^{(n)})$. Here, considering that the optical components to be detected are a multiplexed component (optical beat component) generated from the spectral components $F_{n-1}$ and $U_{n-1}$, a multiplexed component (optical beat component) generated from the spectral components $F_n$ and $U_n$, and a multiplexed component (optical beat component) generated from the spectral components $F_{n+1}$ and $U_{n+1}$, when the bandwidth of the reception signals $RF_1$ to $RF_N$ is represented as $BW/2$, the following relational expressions (1) and (2) are desirably satisfied.

$$f_{RF} - f_d + \frac{BW}{2} \leq f_c^{(n+1)} - f_{RF} - f_c^{(n)} - f_d \tag{1}$$

$$f_{RF} - f_d + \frac{BW}{2} \leq f_c^{(n+1)} - f_{RF} - f_c^{(n)} - f_{RF} \tag{2}$$

The following relational expressions (3) and (4) are established from the expressions (1) and (2).

$$2f_{RF} + \frac{BW}{2} \leq f_c \tag{3}$$

$$3f_{RF} - f_d + \frac{BW}{2} \leq f_c \tag{4}$$

According to the expressions (3) and (4), for example, when the frequency $f_{RF}$ is 40 GHz and the BW is 2 GHz, the optical frequency interval ($f_c$) is equal to or more than 81 GHz and the frequency shift amount fit is equal to or less than 40 GHz.

As described above, in the optical control type phased array antenna 1 of the first embodiment, it is possible to compensate for the phase difference between the modulated optical signals $ML_1$ to $ML_N$ without using a spatial system. Since the optical dispersion compensation characteristic of the optical dispersion compensator $41_1$ to $41_M$ can be individually set, it is possible to simultaneously generate the M reception signals $RS_1$ to $RS_M$ in which the reception efficiency is optimized for each of the M arrival directions of the reception wave. Therefore, it is possible to suppress deterioration of reception efficiency caused by the arrival direction of the reception wave, and to provide the optical control type phased array antenna 1 having excellent environmental resistance. Since optical dispersion compensation is performed without using a spatial system, it is possible to reduce the size of the configuration of the optical signal processing circuit, and it is easy to reduce the size of the optical control type phased array antenna 1.

The non-spatial optical transmission line in the optical control type phased array antenna 1 is not limited to an optical fiber, and a planar optical waveguide or an optical integrated circuit may be used. When the planar optical waveguide or the optical integrated circuit is used as the non-spatial optical transmission line (for example, in a case of using a configuration in which a plurality of planar optical integrated circuits are stacked), it is possible to provide the optical control type phased array antenna 1 that is very small and lightweight. The same applies to the optical control type phased array antennae 2 to 7 of second to seventh embodiments described later.

Second Embodiment

Figure 4:
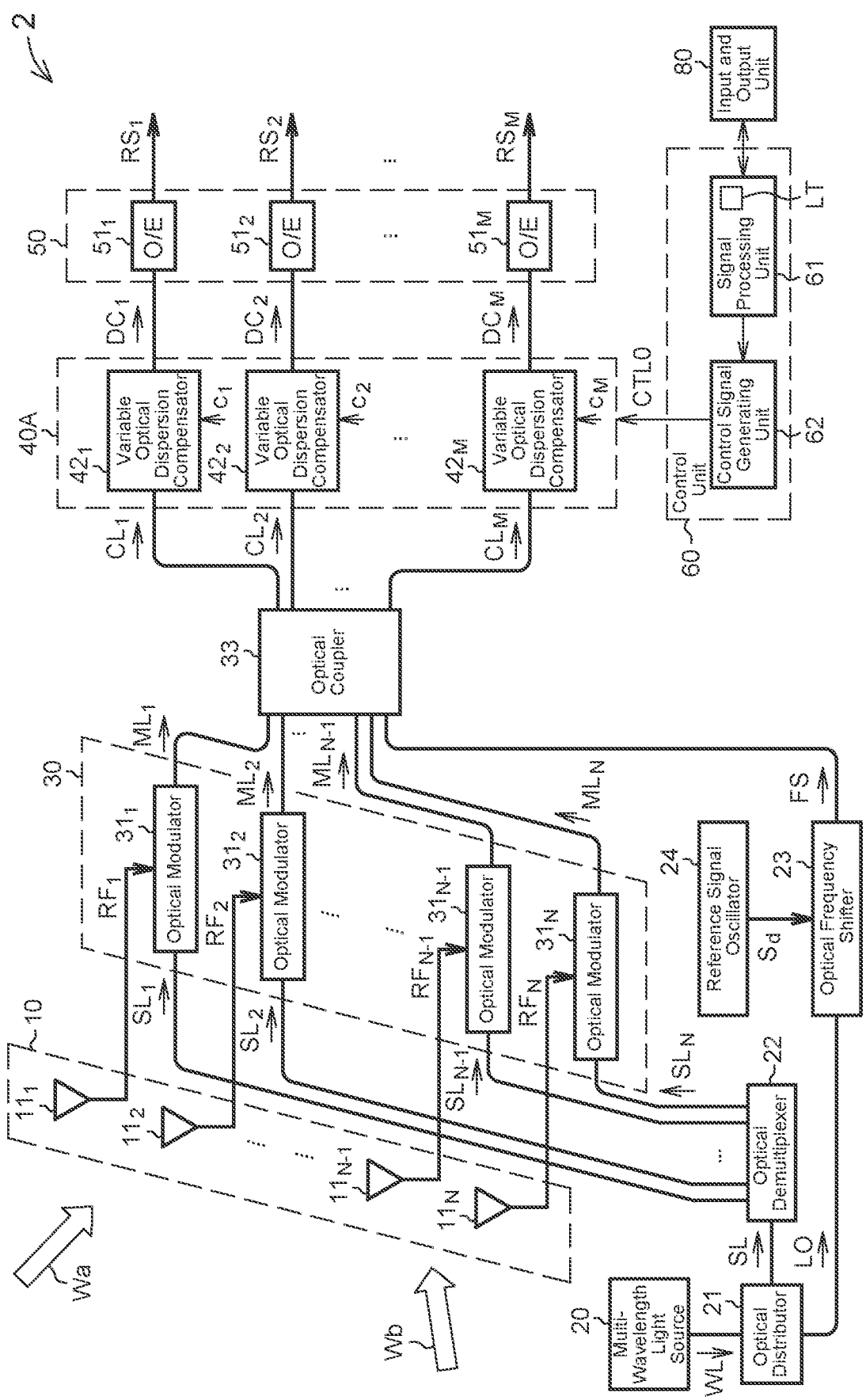
FIG. 4 is a diagram illustrating a schematic configuration of an optical control type phased array antenna of a second embodiment according to the present invention.

Next, the second embodiment according to the present invention will be described. FIG. 4 is a diagram illustrating a schematic configuration of an optical control type phased array antenna 2 according to the second embodiment of the present invention. The configuration of the optical control type phased array antenna 2 of the present embodiment is the same as the configuration of the optical control type phased array antenna 1 of the first embodiment except that an optical dispersion compensation circuit 40A, a control unit 60, and an input and output unit 80 are included instead of the optical dispersion compensation circuit 40 of the first embodiment.

The optical dispersion compensation circuit 40A includes variable optical dispersion compensators $42_1$, $42_2$, . . . , and $42_M$ that perform dispersion compensation on the reception optical signals $CL_1$, $CL_2$, . . . , and $CL_M$, respectively. The control unit 60 includes a signal processing unit 61 for instructing a compensation amount in the variable optical dispersion compensators $42_1$, $42_2$, . . . , and $42_M$, and a control signal generating unit 62 for generating a control signal CTL0 for optical dispersion compensation for the variable optical dispersion compensators $42_1$ to $42_M$. The control signal CTL0 includes a bundle of M control signals $c_1$ to $c_M$ to be supplied to the variable optical dispersion compensators $42_1$ to $42_M$, respectively.

The signal processing unit 61 includes a lookup table LT for storing M data sets for respectively instructing M compensation amounts to be set in the variable optical dispersion compensators $42_1$ to $42_M$. The lookup table LT can be configured by a rewritable nonvolatile memory. The signal processing unit 61 refers to the lookup table LT and can instruct M compensation amounts on the basis of the M data sets.

In addition, the signal processing unit 61 can rewrite M data sets in the lookup table LT by setting data input from the outside via the input and output unit 80. As a result, it is possible to rewrite the M data sets so as to conform to the environment (for example, a radio wave propagation environment or an arrival direction of a radio wave from a specific radio wave transmission station) of the installation location of the optical control type phased array antenna 2. Examples of the input and output unit 80 include an input and output interface unit that electrically connects an operation panel (not illustrated) on which a user can perform operation input and the control unit 60, and a communication interface unit that can transmit and receive data to and from an external communication device (not illustrated) via a communication network.

As described above, in the optical control type phased array antenna 2 of the second embodiment, the control unit 60 can appropriately adjust the compensation amounts in the variable optical dispersion compensators $42_1$ to $42_M$ so as to conform to the environment of the installation location of the optical control type phased array antenna 2. As a result, it is possible to improve the reception efficiency in accordance with the environment of the installation location of the optical control type phased array antenna 2.

Note that, all or part of the functions of the control unit 60 can be implemented, for example, by one or more processors having a semiconductor integrated circuit, such as a digital signal processor (DSP), an application specific integrated circuit (ASIC) or a field-programmable gate array (FPGA). Alternatively, all or part of the functions of the control unit 60 may be implemented by one or more processors including an arithmetic unit, such as a central processing unit (CPU) or a graphics processing unit (GPU) that executes program codes of software or firmware. Alternatively, all or part of the functions of the control unit 60 can also be implemented by one or more processors including a combination of a semiconductor integrated circuit such as DSP, ASIC or FPGA and an arithmetic unit such as CPU or GPU.

Third Embodiment

Figure 5:
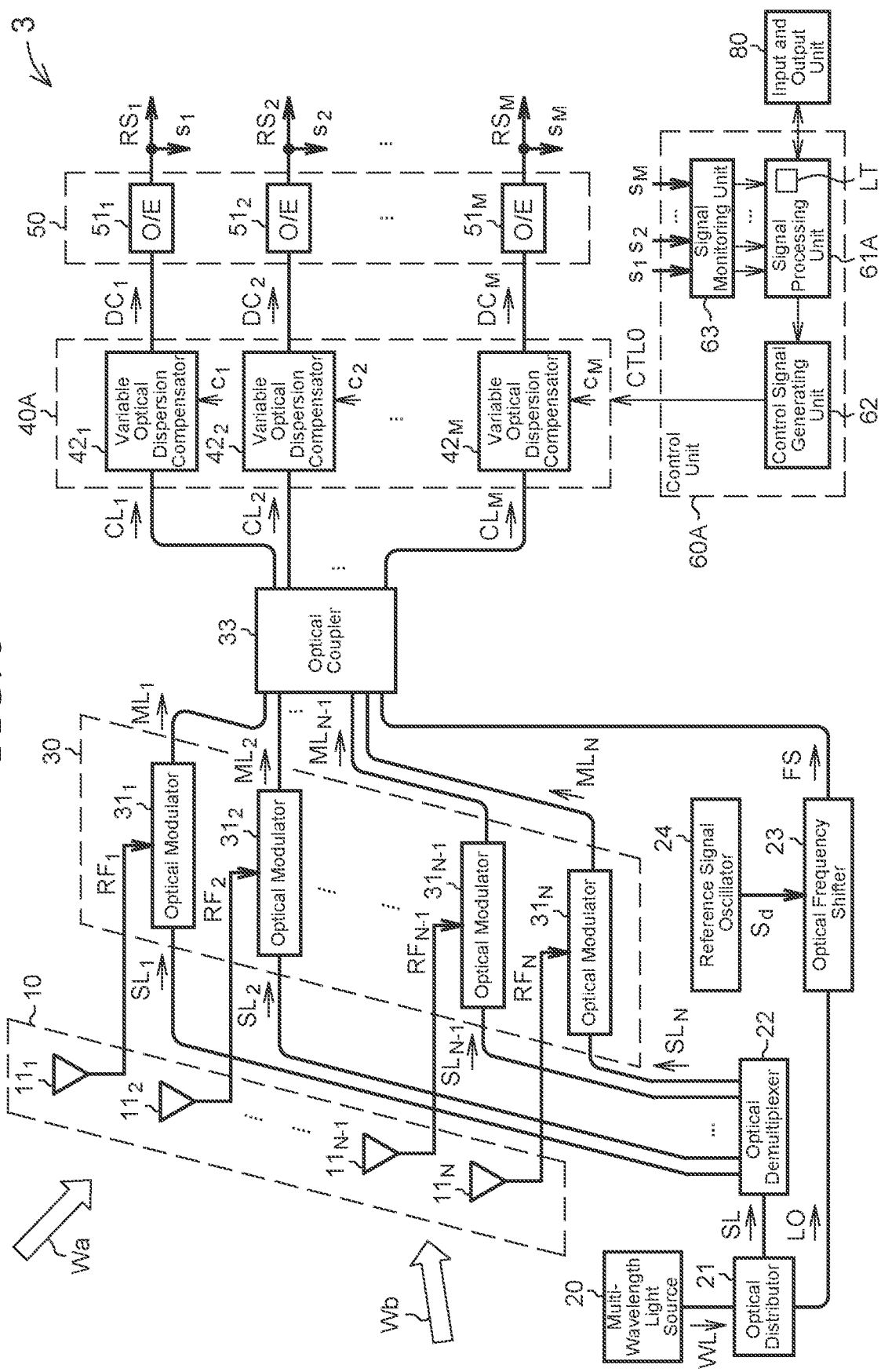
FIG. 5 is a diagram illustrating a schematic configuration of an optical control type phased array antenna of a third embodiment which is a modification of the second embodiment according to the present invention.

Next, the third embodiment according to the present invention will be described. FIG. 5 is a diagram illustrating a schematic configuration of an optical control type phased array antenna 3 of the third embodiment which is a modification of the second embodiment according to the present invention. The configuration of the optical control type phased array antenna 3 of the present embodiment is the same as the configuration of the optical control type phased array antenna 2 of the second embodiment except that a control unit 60A illustrated in FIG. 5 is included instead of the control unit 60 of the second embodiment and that branch signals $s_1$ to $s_M$ forming a part of the reception signals $RS_1$ to $RS_M$ are fed back and supplied to the control unit 60A.

The control unit 60A of the present embodiment includes a signal processing unit 61A for instructing compensation amounts in the variable optical dispersion compensators $42_1$, $42_2$, . . . , and $42_M$, a control signal generating unit 62 for generating a control signal CTL0 for optical dispersion compensation for the variable optical dispersion compensators $42_1$ to $42_M$, and a signal monitoring unit 63 for measuring received signal strength (received power) of each of the branch signals $s_1$ to $s_M$ or of the reception signals $RS_1$ to $RS_M$ on the basis of the branch signals $s_1$ to $s_M$. The signal monitoring unit 63 outputs M measurement signals indicating the measurement result to the signal processing unit 61A.

Similarly to the signal processing unit 61 of the second embodiment, the signal processing unit 61A includes a lookup table LT for storing M data sets for respectively instructing M compensation amounts to be set in the variable optical dispersion compensators $42_1$ to $42_M$. Therefore, the signal processing unit 61A can refer to the lookup table LT and instruct the M compensation amounts on the basis of the M data sets. In addition, the signal processing unit 61A can rewrite M data sets in the lookup table LT by setting data input from the outside via the input and output unit 80. As a result, it is possible to rewrite the M data sets so as to conform to the environment (for example, a radio wave propagation environment or an arrival direction of a radio wave from a specific radio wave transmission station) of the installation location of the optical control type phased array antenna 3.

The signal processing unit 61A of the present embodiment can further improve the reception power or the signal-to-noise ratio (SN ratio) of each reception channel by adaptively rewriting the M data sets in the lookup table LT using the M measurement signals supplied from the signal monitoring unit 63, and can estimate the arrival direction of the radio wave to the antenna array 10. Specifically, when detecting a reception channel having reception power lower than the threshold, the signal processing unit 61A can adaptively and dynamically rewrite the data set so that the compensation amount in the variable optical dispersion compensator $42_m$ of the reception channel is optimized.

In addition, the variable optical dispersion compensators $42_1$ to $42_N$ can be set to have optical dispersion compensation characteristics respectively optimized for M arrival directions determined in advance. In this case, the signal processing unit 61A can detect the reception channel on which the maximum reception power is measured on the basis of the M measurement signals and estimate the arrival direction determined for the reception channel as the arrival direction of the radio wave to the antenna array 10. The signal processing unit 61A can notify an external device (not illustrated) of the estimated arrival direction via the input and output unit 80.

As described above, in the optical control type phased array antenna 3 of the third embodiment, similarly to the second embodiment, the control unit 60A can appropriately adjust the compensation amounts in the variable optical dispersion compensators $42_1$ to $42_M$ so as to conform to the environment of the installation location of the optical control type phased array antenna 3, so that the reception efficiency can be improved in accordance with the environment of the installation location of the optical control type phased array antenna 2. Further, in the present embodiment, the M data sets can be adaptively and dynamically rewritten in accordance with the environment (for example, a radio wave propagation environment or an arrival direction of a radio wave from a specific radio wave transmission station) of the installation location of the optical control type phased array antenna 3 using the measurement result by the signal monitoring unit 63, and thus, it is possible to supply the high-quality reception signals $RS_1$ to $RS_M$.

Fourth Embodiment

Figure 6:
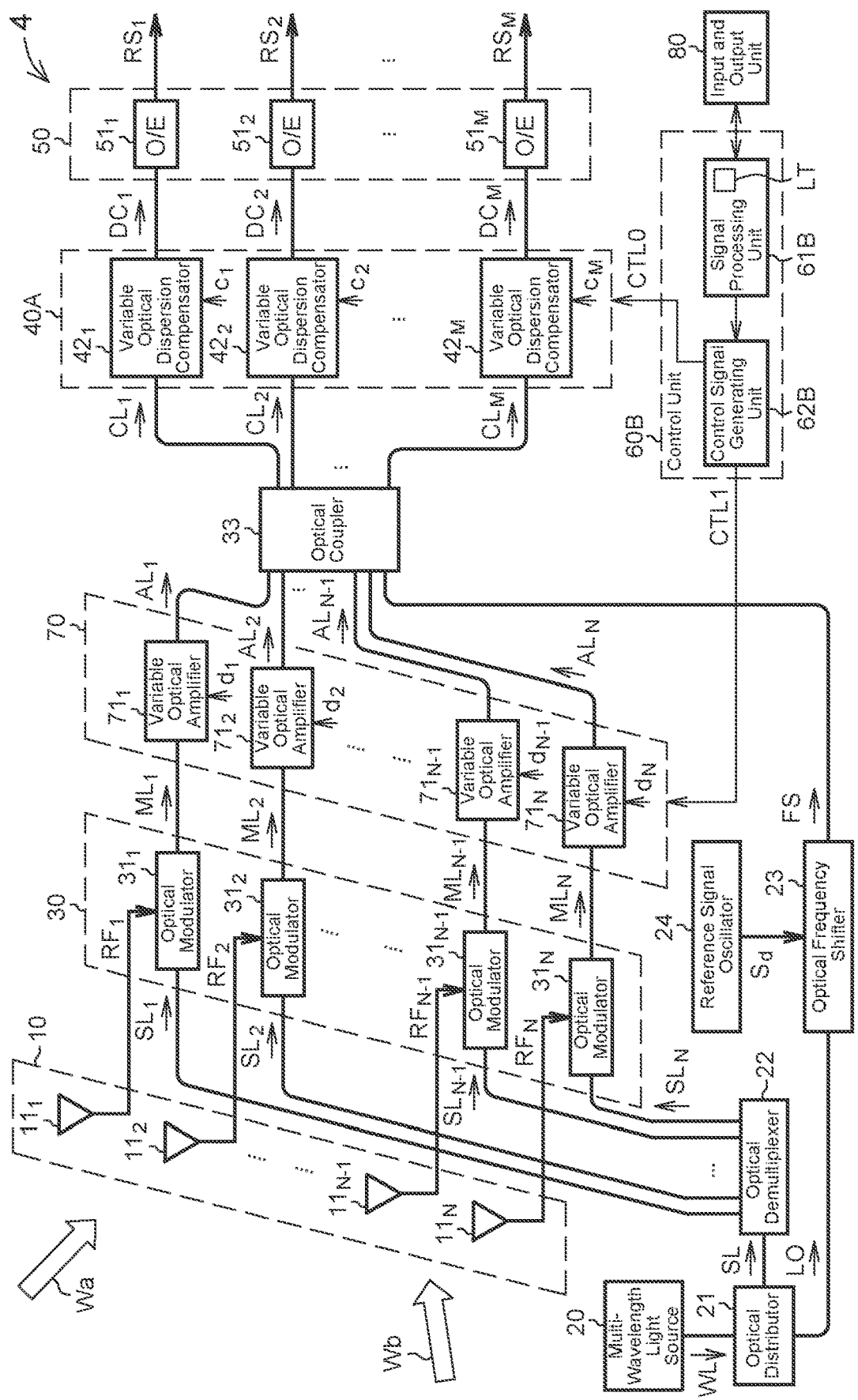
FIG. 6 is a diagram illustrating a schematic configuration of an optical control type phased array antenna of a fourth embodiment according to the present invention.

Next, the fourth embodiment according to the present invention will be described. FIG. 6 is a diagram illustrating a schematic configuration of an optical control type phased array antenna 4 according to the fourth embodiment of the present invention. The configuration of the optical control type phased array antenna 4 of the present embodiment is the same as the configuration of the optical control type phased array antenna 2 of the second embodiment except that an optical amplifier circuit 70 is interposed between the optical modulator array 30 and the optical coupler 33 of the second embodiment and a control unit 60B is included instead of the control unit 60 of the second embodiment.

The control unit 60B includes a signal processing unit 61B for instructing compensation amounts in the variable optical dispersion compensators $42_1, 42_2, \ldots,$ and $42_M$, and a control signal generating unit 62B having a function similar to that of the control unit 60 of the second embodiment. The control signal generating unit 62B can also supply a control signal CTL1 for controlling the operation of the optical amplifier circuit 70.

Referring to FIG. 6, the optical amplifier circuit 70 includes variable optical amplifiers $71_1$ to $71_N$ for amplifying the modulated optical signals $ML_1$ to $ML_N$ supplied from the optical modulator array 30 with variable gains, respectively. The variable optical amplifiers $71_1$ to $71_N$ amplify the modulated optical signals $ML_1$ to $ML_N$ with the gains specified by the control signal CTL1 supplied from the control signal generating unit 62B to generate amplified optical signals $AL_1$ to $AL_N$, and supplies the amplified optical signals $AL_1$ to $AL_N$ to the optical coupler 33. The optical coupler 33 collectively multiplexes the amplified optical signals $AL_1$ to $AL_N$ and the frequency-shifted light FS to generate multiplexed light, and divides the multiplexed light into the reception optical signals $CL_1, CL_2, \ldots, CL_{M-1}$, and $CL_M$ of the M reception channels.

For example, as the variable optical amplifiers $71_1$ to $71_N$, it is preferable to use an optical amplifier having a wide operating wavelength range, such as a semiconductor optical amplifier or an erbium doped optical fiber amplifier (EDFA).

The signal processing unit 61B can instruct the compensations amount in the variable optical dispersion compensators $42_1, 42_2, \ldots, 42_{M-1}$, and $42_M$ and instruct the variable gains in the variable optical amplifiers $71_1$ to $71_N$. The control signal generating unit 62B generates a control signal CTL0 for optical dispersion compensation for the variable optical dispersion compensators $42_1$ to $42_M$ and generates a control signal CTL1 for gain adjustment for the variable optical amplifiers $71_1$ to $71_N$. The control signal CTL1 includes a bundle of N control signals $d_1$ to $d_N$ to be supplied to the variable optical amplifiers $71_1$ to $71_N$, respectively.

Figure 7A:
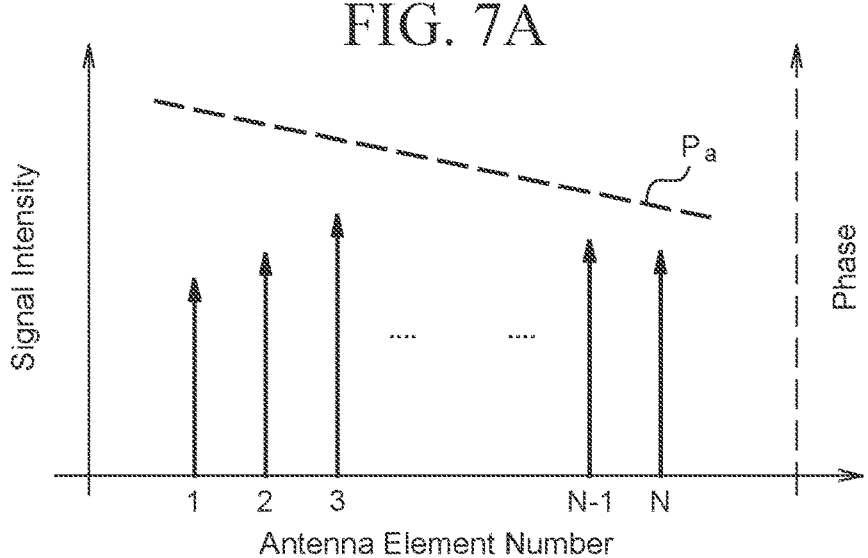
FIG. 7A is a graph illustrating an example of signal intensity of an output signal of an antenna array.

FIG. 7A is a graph conceptually illustrating an example of signal intensity of the high-frequency signals $RF_1$ to $RF_N$ output from the antenna array 10 and a phase distribution Pa. In FIG. 7A, the horizontal axis represents the number of the antenna elements $11_1$ to $11_N$, the left vertical axis represents the signal intensity, and the right vertical axis represents the phase. As illustrated in FIG. 7A, a signal intensity difference (amplitude difference) occurs between the high-frequency signals $RF_1$ to $RF_N$, and a phase distribution $P_a$ that causes a phase difference between the high-frequency signals $RF_1$ to $RF_N$ is formed. The signal intensity difference (amplitude difference) between the high-frequency signals $RF_1$ to $RF_N$ is caused by the antenna directivity of the antenna array 10.

Figure 7B:
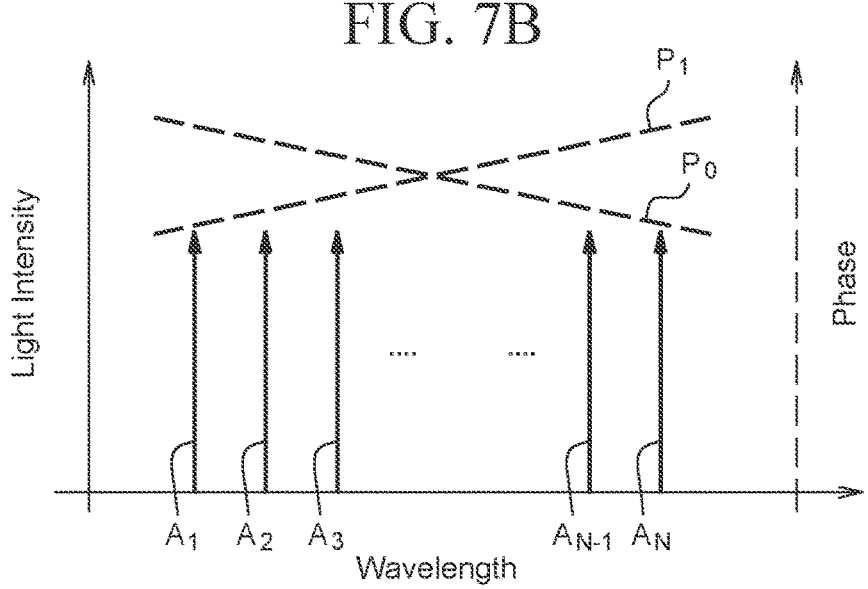
FIGS. 7B and 7C are graphs illustrating a relationship between a signal wavelength and light intensity and a relationship between a signal wavelength and a phase.
Figure 7C:
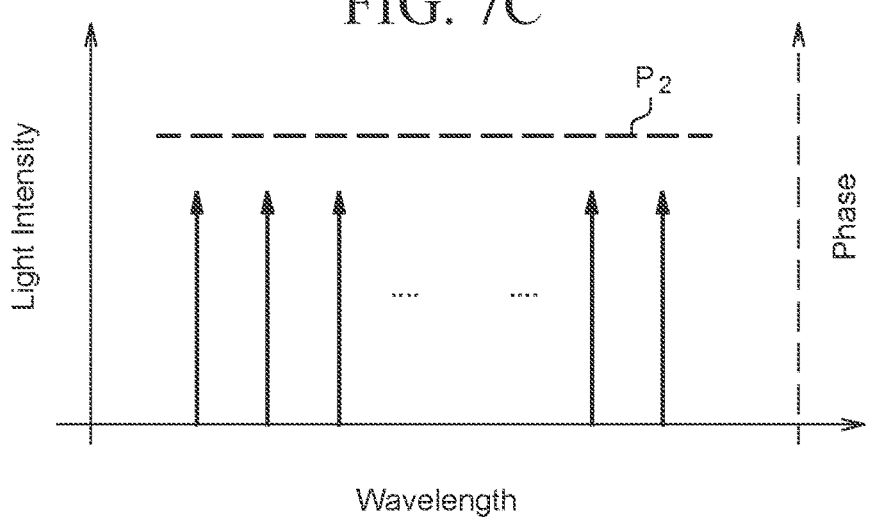

FIG. 7B is a graph conceptually illustrating spectral components $A_1$ to $A_N$ of the amplified optical signals $AL_1$ to $AL_N$ and an example of a phase distribution $P_0$ of the amplified optical signals $AL_1$ to $AL_N$. In the graph of FIG. 7B, the horizontal axis represents the wavelengths of the amplified optical signals $AL_1$ to $AL_N$, the left vertical axis represents the light intensity, and the right vertical axis represents the phase. Since the optical amplifier circuit 70 can compensate for the deviation between the signal intensities illustrated in FIG. 7A, the light intensities of the spectral components $A_1$ to $A_N$ are substantially constant as illustrated in FIG. 7B. When the phase distribution $P_0$ that causes the phase difference between the amplified optical signals $AL_1$ to $AL_N$ is generated as illustrated in FIG. 7B, the optical dispersion compensator $41_m$ of the optical dispersion compensation circuit 40A can add the phase distribution $P_1$ that cancels the phase difference to the reception optical signal $CL_m$. As a result, the optical dispersion compensator $41_m$ of the optical dispersion compensation circuit 40A can output the optical signal $DC_m$ forming the flat phase distribution $P_2$ as illustrated in FIG. 7C.

In addition, since a light intensity difference may occur between the spectral components $C_1, C_2, \ldots, C_{N-1}$, and $C_N$ of the output light WL, the optical amplifier circuit 70 can also compensate for such a light intensity difference.

As described above, the optical control type phased array antenna 4 of the fourth embodiment can achieve the same effects as those of the first and second embodiments. Since the optical control type phased array antenna 4 further includes the optical amplifier circuit 70, it is possible to compensate for the light intensity difference between the spectral components $C_1$ to $C_N$ of the output light WL, and it is possible to compensate for the signal intensity difference (amplitude difference) between the high-frequency signals $RF_1$ to $RF_N$, so that it is possible to further improve the reception efficiency as compared with the first to third embodiments.

Fifth Embodiment

Figure 8:
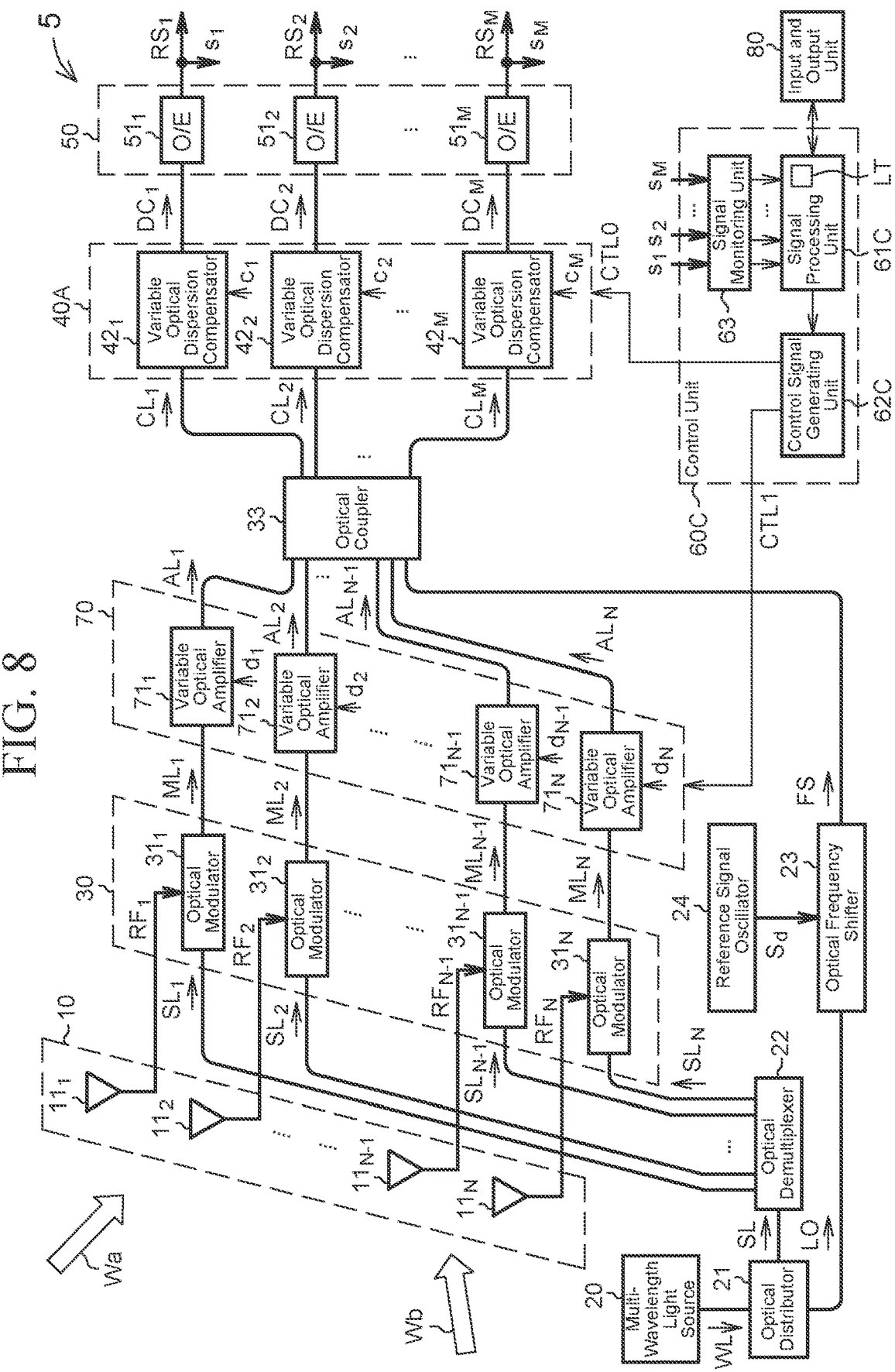
FIG. 8 is a diagram illustrating a schematic configuration of an optical control type phased array antenna of a fifth embodiment which is a modification of the fourth embodiment according to the present invention.

Next, the fifth embodiment according to the present invention will be described. FIG. 8 is a diagram illustrating a schematic configuration of an optical control type phased array antenna 5 according to the fifth embodiment of the present invention. The configuration of the optical control type phased array antenna 5 of the present embodiment is the same as the configuration of the optical control type phased array antenna 4 of the fourth embodiment except that a control unit 60C illustrated in FIG. 8 is included instead of the control unit 60B of the fourth embodiment and that branch signals $s_1$ to $s_M$ forming a part of the reception signals $RS_1$ to $RS_M$ are fed back and supplied to the control unit 60C.

The control unit 60C of the present embodiment includes a signal processing unit 61C for instructing compensation amounts in the variable optical dispersion compensators $42_1$, $42_2$, ..., and $42_M$, a control signal generating unit 62C for generating a control signal CTL0 for optical dispersion compensation for the variable optical dispersion compensators $42_1$ to $42_M$, and a signal monitoring unit 63 for measuring received signal strength (received power) of the branch signals $s_1$ to $s_M$ or the reception signals $RS_1$ to $RS_M$ on the basis of the branch signals $s_1$ to $s_M$. The signal monitoring unit 63 outputs M measurement signals indicating the measurement result to the signal processing unit 61C. The signal processing unit 61C operates similarly to the signal processing unit 61A of the third embodiment. In addition, the control signal generating unit 62C can supply the control signal CTL1 for controlling the operation of the optical amplifier circuit 70 by operating similarly to the control signal generating unit 62B of the fourth embodiment.

Therefore, the optical control type phased array antenna 5 of the fifth embodiment can achieve the same effects as those of the first, third, and fourth embodiments.

Sixth Embodiment

Figure 9:
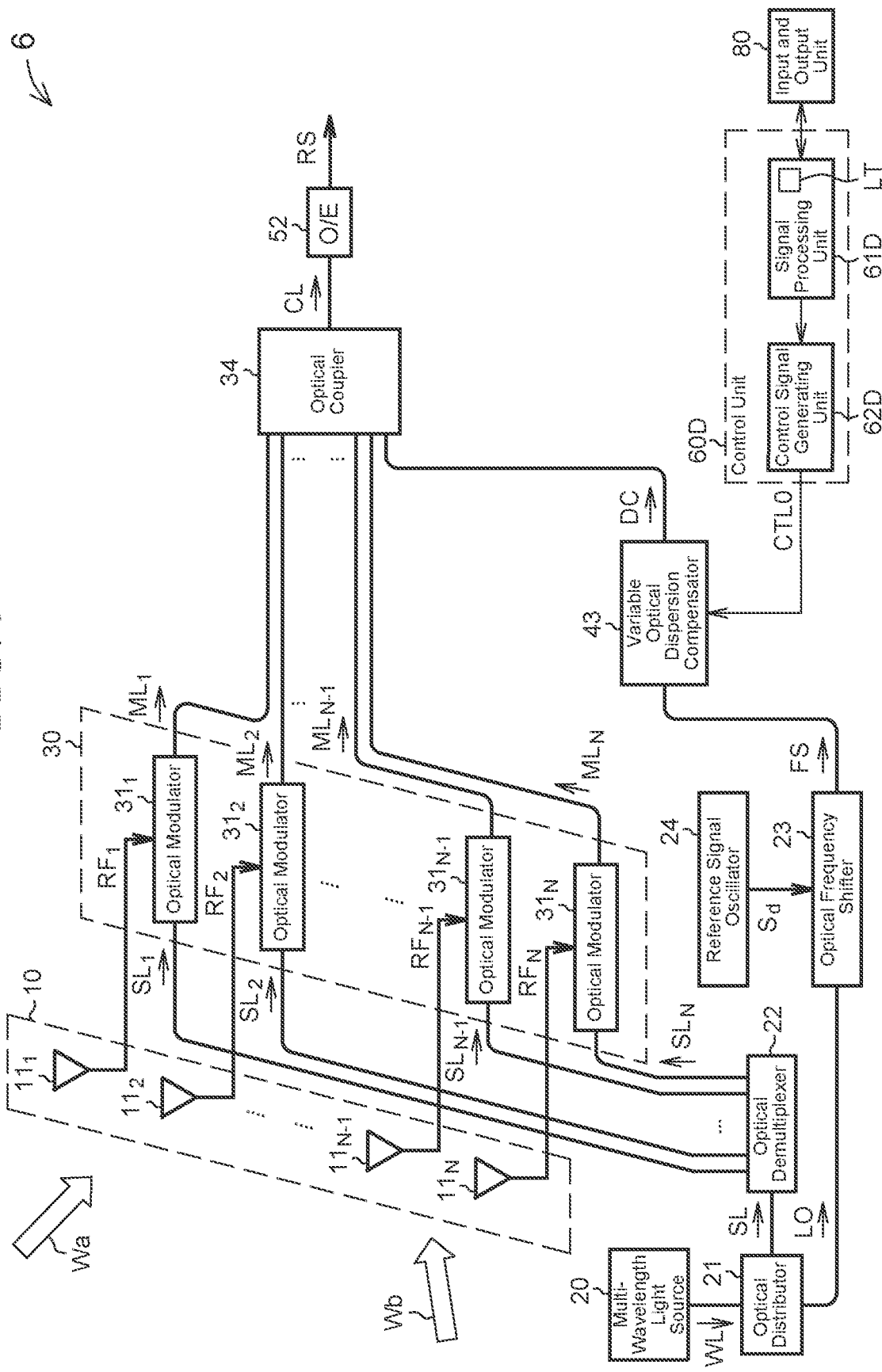
FIG. 9 is a diagram illustrating a schematic configuration of an optical control type phased array antenna of a sixth embodiment according to the present invention.

Next, the sixth embodiment according to the present invention will be described. FIG. 9 is a diagram illustrating a schematic configuration of an optical control type phased array antenna 6 according to the sixth embodiment of the present invention. The configuration of the optical control type phased array antenna 6 of the present embodiment is the same as the configuration of the optical control type phased array antenna 1 of the first embodiment except that an optical coupler 34, a photoelectric converter (O/E) 52, a variable optical dispersion compensator 43, a control unit 60D, and an input and output unit 80 are included instead of the optical coupler 33, the optical dispersion compensation circuit 40, and the photoelectric conversion circuit 50 of the first embodiment.

The variable optical dispersion compensator 43 has a function of compensating for a phase difference between the modulated optical signals $ML_1$ to $ML_N$ caused by the arrival directions of the reception waves Wa and Wb by performing dispersion compensation on the frequency-shifted light FS supplied from the optical frequency shifter 23. The optical frequency shifter 23 and the variable optical dispersion compensator 43 are coupled by a non-spatial optical transmission line such as an optical fiber that propagates the frequency-shifted light FS, the variable optical dispersion compensator 43 and the optical coupler 34 are coupled by a non-spatial optical transmission line such as an optical fiber that propagates the optical output signal DC of the variable optical dispersion compensator 43, and the optical modulator array 30 and the optical coupler 34 are coupled by a non-spatial optical transmission line such as an optical fiber that propagates the modulated optical signals $ML_1$ to $ML_N$.

The control unit 60D includes a signal processing unit 61D for instructing a compensation amount in the variable optical dispersion compensator 43 and a control signal generating unit 62D for generating a control signal CTL0 for optical dispersion compensation for the variable optical dispersion compensator 43. The signal processing unit 61D includes a lookup table LT for storing a data set for instructing the compensation amount to be set in the variable optical dispersion compensator 43. The lookup table LT can be configured by a rewritable nonvolatile memory. The signal processing unit 61D can refer to the lookup table LT and instruct the compensation amount on the basis of the data set.

In addition, the signal processing unit 61D can rewrite the data set in the lookup table LT with setting data input from the outside via the input and output unit 80. As a result, it is possible to rewrite the data set so as to conform to the environment (for example, a radio wave propagation environment or an arrival direction of a radio wave from a specific radio wave transmission station) of the installation location of the optical control type phased array antenna 6. Examples of the input and output unit 80 include an input and output interface unit that electrically connects an operation panel (not illustrated) on which a user can perform operation input and the control unit 60D, and a communication interface unit that can transmit and receive data to and from an external communication device (not illustrated) via a communication network.

The optical coupler 34 collectively multiplexes the modulated optical signals $ML_1$ to $ML_N$ and the optical output signal DC of the variable optical dispersion compensator 43 to generate multiplexed light CL, and outputs the multiplexed light CL to the photoelectric converter 52. The photoelectric converter 52 converts the multiplexed light CL into an electric signal RS and outputs the electric signal RS as a reception signal.

Here, the signal value of the reception signal RS is I, the electric field, the optical frequency, and the phase of the signal light SL are $E_S$, $f_S$, and $\phi_S$, respectively, the electric field, the optical frequency, and the phase of the local oscillation light LO are $E_L$, $f_L$, and $\phi_L$, respectively, and the conversion efficiency of the photoelectric converter 52 is $\eta$. For convenience of description, if parameters related to the modulated optical signals $ML_1$ to $ML_N$ are omitted, the signal value I of the reception signal RS is expressed by, for example, the following equation (5).

$$I = \eta \cdot E_S \cdot E_L \cdot \cos(2\pi(f_S - f_L) + (\phi_S - \phi_L)) \tag{5}$$

As described above, in the optical control type phased array antenna 6 of the sixth embodiment, since the phase difference between the modulated optical signals $ML_1$ to $ML_N$ can be compensated without using a spatial system, it is possible to suppress the deterioration of the reception efficiency caused by the arrival direction of the reception wave, and to provide the optical control type phased array antenna 6 excellent in environmental resistance. In addition, since optical dispersion compensation is performed without using a spatial system, it is possible to reduce the size of the configuration of the optical signal processing circuit, and it is easy to reduce the size of the optical control type phased array antenna 4.

Furthermore, the control unit 60D can adjust the compensation amount in the variable optical dispersion compensator 43 in accordance with the arrival direction of the reception wave. As a result, reception efficiency can be improved.

Furthermore, the control unit 60D can appropriately adjust the compensation amount in the variable optical dispersion compensator 43 so as to conform to the environment of the installation location of the optical control type phased array antenna 6. As a result, it is possible to improve reception efficiency in accordance with the environment of the installation location of the optical control type phased array antenna 6.

In the configuration of the embodiment 6, the optical amplifier circuit 70 of the fourth embodiment may be interposed between the optical coupler 34 and the optical modulator array 30.

Seventh Embodiment

Figure 10:
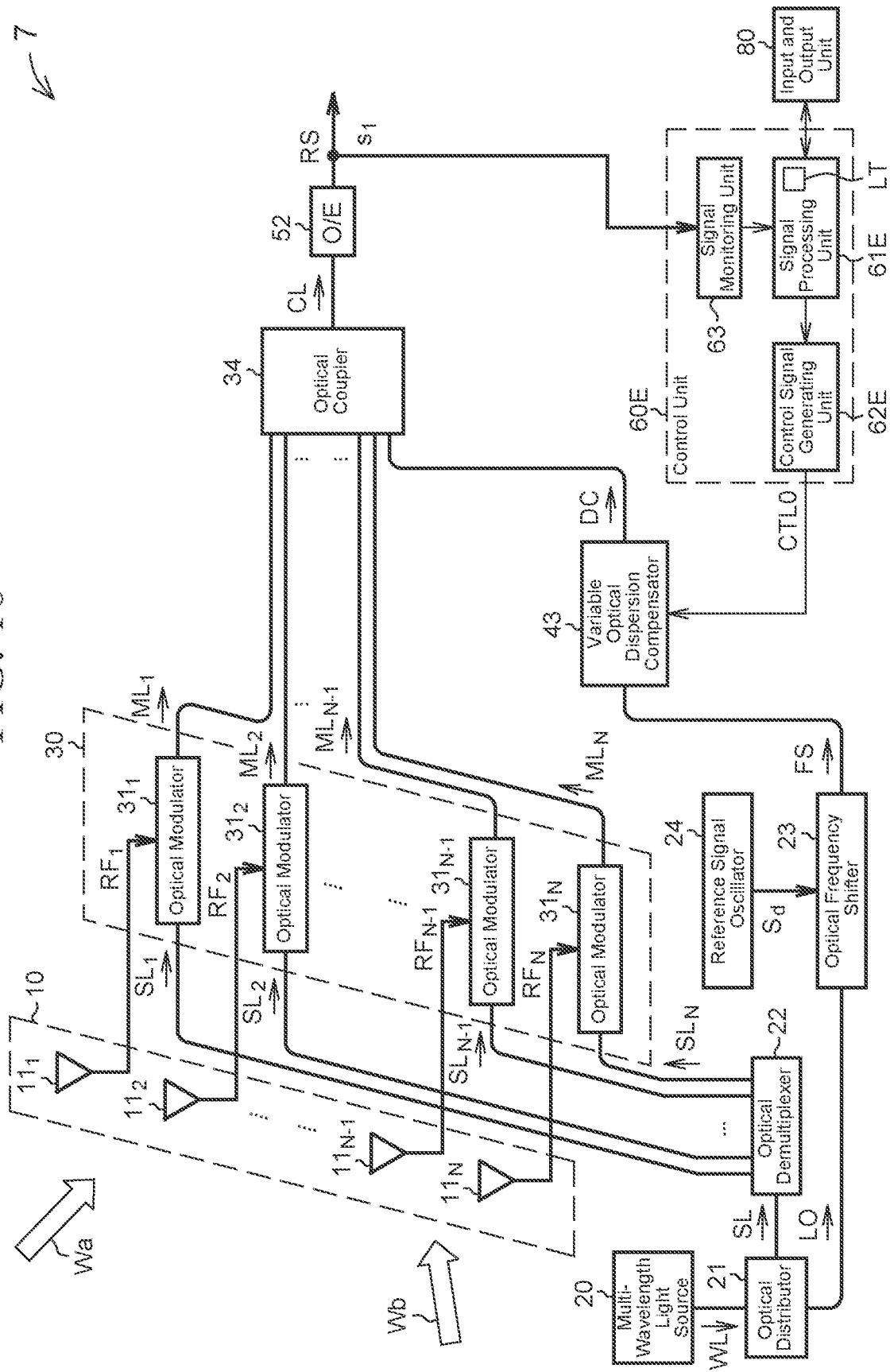
FIG. 10 is a diagram illustrating a schematic configuration of an optical control type phased array antenna of a seventh embodiment which is a modification of the sixth embodiment according to the present invention.

Next, the seventh embodiment according to the present invention will be described. FIG. 10 is a diagram illustrating a schematic configuration of an optical control type phased array antenna 7 of the seventh embodiment which is a modification of the sixth embodiment according to the present invention. The configuration of the optical control type phased array antenna 7 of the present embodiment is the same as the configuration of the optical control type phased array antenna 6 of the sixth embodiment except that a control unit 60E illustrated in FIG. 10 is included instead of the control unit 60D of the sixth embodiment and that the branch signal $s_1$ forming a part of the reception signal RS is fed back and supplied to the control unit 60E.

The control unit 60E of the present embodiment includes a signal processing unit 61E for instructing a compensation amount in the variable optical dispersion compensator 43, a control signal generating unit 62E for generating a control signal CTL0 for optical dispersion compensation for the variable optical dispersion compensator 43, and a signal monitoring unit 63 for measuring received signal strength (received power) of the branch signal $s_1$ or the reception signal RS on the basis of the branch signal $s_1$. The signal monitoring unit 63 outputs a measurement signal indicating the measurement result to the signal processing unit 61E.

Similarly to the signal processing unit 61D of the sixth embodiment, the signal processing unit 61E includes a lookup table LT for storing a data set for instructing the compensation amount to be set in the variable optical dispersion compensator 43. Therefore, the signal processing unit 61E can refer to the lookup table LT and instruct the compensation amount on the basis of the data set. In addition, the signal processing unit 61E can rewrite the data set in the lookup table LT with setting data input from the outside via the input and output unit 80. As a result, it is possible to rewrite the data set so as to conform to the environment (for example, a radio wave propagation environment or an arrival direction of a radio wave from a specific radio wave transmission station) of the installation location of the optical control type phased array antenna 7.

The signal processing unit 61E of the present embodiment can further improve the reception power or the signal-to-noise ratio (SN ratio) by adaptively rewriting the data set in the lookup table LT using the measurement signal supplied from the signal monitoring unit 63. Specifically, when detecting that the reception power is lower than the threshold, the signal processing unit 61A can adaptively and dynamically rewrite the data set so that the compensation amount in the variable optical dispersion compensator 43 is optimized.

In addition, the variable optical dispersion compensator 43 can be set to have an optical dispersion compensation characteristic optimized for each of a plurality of predetermined arrival directions determined in advance. In this case, the signal processing unit 61E can sequentially instruct to switch to the optical dispersion compensation characteristic corresponding to each of the plurality of arrival directions, detect the optical dispersion compensation characteristic in which the maximum reception power is measured on the basis of the measurement signal, and estimate the arrival direction determined for the optical dispersion compensation characteristic as the arrival direction of the radio wave to the antenna array 10. The signal processing unit 61E can notify an external device (not illustrated) of the estimated arrival direction via the input and output unit 80.

As described above, in the optical control type phased array antenna 7 of the seventh embodiment, similarly to the sixth embodiment, the control unit 60E can appropriately adjust the compensation amount in the variable optical dispersion compensator 43 so as to conform to the environment of the installation location of the optical control type phased array antenna 7, so that the reception efficiency can be improved in accordance with the environment of the installation location of the optical control type phased array antenna 7. In the present embodiment, further, the data set can be rewritten adaptively and dynamically in accordance with the environment (for example, a radio wave propagation environment or an arrival direction of a radio wave from a specific radio wave transmission station) of the installation location of the optical control type phased array antenna 7 using the measurement result by the signal monitoring unit 63, so that the high-quality reception signal RS can be supplied.

Although the first to seventh embodiments according to the present invention have been described above with reference to the drawings, the first to seventh embodiments are examples of the present invention, and various embodiments other than the first to seventh embodiments are possible. Within the scope of the present invention, free combinations of the first to seventh embodiments, deformation of any component of each embodiment, or omission of any component of each embodiment are possible.

For example, similarly to the control unit 60 of the second embodiment, all or part of the functions of the control units 60A to 60E can be implemented by a single or a plurality of processors having a semiconductor integrated circuit such as a DSP, an ASIC, or an FPGA. Alternatively, all or part of the functions of the control units 60A to 60E may be implemented by a single or a plurality of processors including an arithmetic unit such as a CPU or a GPU that executes program codes of software or firmware. Alternatively, all or part of the functions of the control units 60A to 60E can also be implemented by a single or a plurality of processors including a combination of a semiconductor integrated circuit such as a DSP, an ASIC or an FPGA and an arithmetic unit such as a CPU or a GPU.

INDUSTRIAL APPLICABILITY

The optical control type phased array antenna according to the present invention is suitable for use in, for example, a radar system, a radio wave monitoring system, a system that simulates a radio wave environment and performs test evaluation thereof, a system that collects and analyzes radio waves (for example, an electronic defense system), and a wireless communication system (for example, a satellite communication system and a mobile communication system).

REFERENCE SIGNS LIST 1 to 7: optical control type phased array antenna, 10: antenna array, $11_1$ to $11_N$: antenna element, 20: multi-wavelength light source, 21: optical distributor, 22: optical demultiplexer, 23: optical frequency shifter, 24: reference signal oscillator, 30: optical modulator array, $31_1$ to $31_N$: optical modulator, 33, 34: optical coupler, 40, 40A: dispersion compensation circuit, $41_1$ to $41_M$: optical dispersion compensator, $42_1$ to $42_M$, 43: variable optical dispersion compensator, 50: photoelectric conversion circuit, $51_1$ to $51_M$, 52: photoelectric converter, 60, 60A to 60E: control unit, 61, 61A to 61E: signal processing unit, 62, 62B to 62E: control signal generating unit, 63: signal monitoring unit, 70: optical amplifier circuit, $71_1$ to $71_N$: variable optical amplifier, 80: input and output unit

The invention claimed is:

1. An optical control type phased array antenna, comprising:
   an antenna array including a plurality of antenna elements for receiving a reception wave in a high frequency band lower than an optical frequency band;
   a multi-wavelength light source for outputting light including a plurality of spectral components having each of a plurality of optical frequencies different from each other;
   an optical demultiplexing circuit for separating a plurality of optical signals each having the plurality of spectral components and local oscillation light from output light of the multi-wavelength light source;
   a plurality of optical modulators for generating a plurality of modulated optical signals by modulating the plurality of optical signals with output signals of the plurality of antenna elements, respectively;
   an optical coupler for multiplexing the plurality of modulated optical signals and the local oscillation light to generate multiplexed light and dividing the multiplexed light into reception optical signals of a plurality of channels; and
   a plurality of optical dispersion compensators for compensating for a phase difference between the plurality of modulated optical signals by performing dispersion compensation on the reception optical signals, respectively.

2. The optical control type phased array antenna according to claim 1, further comprising:
   a non-spatial first optical transmission line for coupling between the optical demultiplexing circuit and the optical coupler;
   a non-spatial second optical transmission line for coupling between the plurality of optical modulators and the optical coupler; and
   a non-spatial third optical transmission line for coupling between the optical coupler and the plurality of optical dispersion compensators.

3. The optical control type phased array antenna according to claim 2, wherein the first optical transmission line, the second optical transmission line, and the third optical transmission line comprise an optical fiber.

4. The optical control type phased array antenna according to claim 3, further comprising processing circuitry, wherein
   the plurality of optical dispersion compensators include a plurality of variable optical dispersion compensators, and
   the processing circuitry variably controls compensation amounts in the plurality of variable optical dispersion compensators.

5. The optical control type phased array antenna according to claim 3, further comprising an optical frequency shifter interposed between the optical demultiplexing circuit and the optical coupler, wherein the optical frequency shifter shifts an optical frequency of the local oscillation light.

6. The optical control type phased array antenna according to claim 2, further comprising processing circuitry, wherein
   the plurality of optical dispersion compensators include a plurality of variable optical dispersion compensators, and
   the processing circuitry variably controls compensation amounts in the plurality of variable optical dispersion compensators.

7. The optical control type phased array antenna according to claim 2, further comprising an optical amplifier circuit interposed between the plurality of optical modulators and the optical coupler for amplifying the plurality of modulated optical signals, respectively.

8. The optical control type phased array antenna according to claim 3, further comprising an optical amplifier circuit interposed between the plurality of optical modulators and the optical coupler for amplifying the plurality of modulated optical signals, respectively.

9. The optical control type phased array antenna according to claim 2, further comprising an optical frequency shifter interposed between the optical demultiplexing circuit and the optical coupler, wherein the optical frequency shifter shifts an optical frequency of the local oscillation light.

10. The optical control type phased array antenna according to claim 1, further comprising processing circuitry, wherein
    the plurality of optical dispersion compensators include a plurality of variable optical dispersion compensators, and
    the processing circuitry variably controls compensation amounts in the plurality of variable optical dispersion compensators.

11. The optical control type phased array antenna according to claim 1, further comprising an optical amplifier circuit interposed between the plurality of optical modulators and the optical coupler for amplifying the plurality of modulated optical signals, respectively.

12. The optical control type phased array antenna according to claim 11, further comprising processing circuitry, wherein
    the optical amplifier circuit includes a plurality of variable optical amplifiers for amplifying the plurality of modulated optical signals with variable gains, respectively, and
    the processing circuitry individually controls the variable gains.

13. The optical control type phased array antenna according to claim 1, further comprising an optical frequency shifter interposed between the optical demultiplexing circuit and the optical coupler, wherein the optical frequency shifter shifts an optical frequency of the local oscillation light.

14. The optical control type phased array antenna according to claim 1, wherein the multi-wavelength light source is an optical comb light source.

15. An optical control type phased array antenna, comprising:
    an antenna array including a plurality of antenna elements for receiving a reception wave in a high frequency band lower than an optical frequency band;
    a multi-wavelength light source for outputting light including a plurality of spectral components having each of a plurality of optical frequencies different from each other;

an optical demultiplexing circuit for separating a plurality of optical signals each having the plurality of spectral components and local oscillation light from output light of the multi-wavelength light source;

a plurality of optical modulators for generating a plurality of modulated optical signals by modulating the plurality of optical signals with output signals of the plurality of antenna elements, respectively;

an optical dispersion compensator for compensating for a phase difference between the plurality of modulated optical signals by performing dispersion compensation on the local oscillation light; and an optical coupler for multiplexing the plurality of modulated optical signals and an optical output of the optical dispersion compensator to generate a reception optical signal.

16. The optical control type phased array antenna according to claim 15, further comprising:

a non-spatial first optical transmission line for coupling between the optical demultiplexing circuit and the optical dispersion compensator;

a non-spatial second optical transmission line for coupling between the optical dispersion compensator and the optical coupler; and a non-spatial third optical transmission line for coupling between the plurality of optical modulators and the optical coupler.

17. The optical control type phased array antenna according to claim 16, wherein the first optical transmission line, the second optical transmission line, and the third optical transmission line comprise an optical fiber.

18. The optical control type phased array antenna according to claim 15, further comprising processing circuitry, wherein the optical dispersion compensator includes a variable optical dispersion compensator, and the processing circuitry variably controls a compensation amount in the variable optical dispersion compensator.

19. The optical control type phased array antenna according to claim 15, further comprising an optical frequency shifter interposed between the optical demultiplexing circuit and the optical dispersion compensator, wherein the optical frequency shifter shifts an optical frequency of the local oscillation light.

20. The optical control type phased array antenna according to claim 15, wherein the multi-wavelength light source is an optical comb light source.

* * * * *